(12) United States Patent
Tylka, Sr.

(10) Patent No.: US 6,415,591 B1
(45) Date of Patent: Jul. 9, 2002

(54) LAWNMOWER BLADE WITH FAN STRUCTURE FOR CREATING ENHANCED AIR MOVEMENT

(76) Inventor: Roman J. Tylka, Sr., 115 Calbreath Ct., Florissant, MO (US) 63031

(*) Notice: Subject to any disclaimer, the term of this patent is extended or adjusted under 35 U.S.C. 154(b) by 0 days.

(21) Appl. No.: 09/653,303

(22) Filed: Sep. 1, 2000

(51) Int. Cl.[7] .................... A01D 34/52; A01D 34/73
(52) U.S. Cl. ........................................ 56/295; 56/255
(58) Field of Search ................... D15/17; D8/20; 56/295, 255

(56) References Cited

U.S. PATENT DOCUMENTS

| | | | | |
|---|---|---|---|---|
| 3,022,621 A | * | 2/1962 | Zavarella | 56/295 |
| 3,068,633 A | * | 12/1962 | Taylor | 56/295 |
| 3,109,275 A | * | 11/1963 | Dunlap et al. | 56/295 |
| 3,445,992 A | * | 5/1969 | Hanson et al. | 56/295 |
| 3,636,685 A | * | 1/1972 | Speckman | 56/295 |
| D268,641 S | | 4/1983 | Bonforte | |
| 4,426,831 A | | 1/1984 | Klas et al. | |
| 5,343,681 A | | 9/1994 | De Jong | |
| 5,452,569 A | | 9/1995 | Anderson | |
| 5,454,216 A | | 10/1995 | Myszka | |
| 5,775,078 A | | 7/1998 | Warren | |
| D440,580 S | * | 4/2001 | Cooper et al. | D15/17 |

* cited by examiner

Primary Examiner—Robert E. Pezzuto
Assistant Examiner—Árpád Fa Kovács

(57) ABSTRACT

A lawnmower blade for cutting grass with a scything action. The lawnmower blade includes elongated bar. The bar is adapted to engage a drive shaft of a lawnmower. The bar has a generally arcuate first cutting edge. The first cutting edge extends along a first side edge of the bar proximate a first end of the bar to a distal end of a second side edge of the bar. The bar further has a generally arcuate second cutting edge. The second cutting edge extends along the second side edge of the bar proximate a second end of the bar to a distal end of the first side edge of the bar.

1 Claim, 2 Drawing Sheets

LAWNMOWER BLADE WITH FAN STRUCTURE FOR CREATING ENHANCED AIR MOVEMENT

BACKGROUND OF THE INVENTION

1. Field of the Invention

The present invention relates to lawnmower blades and more particularly pertains to a new lawnmower blade for cutting grass with a scything action.

2. Description of the Prior Art

The use of lawnmower blades is known in the prior art. More specifically, lawnmower blades heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,452,569; U.S. Pat. No. 5,454,216; U.S. Pat. No. Des. 268,641; U.S. Pat. No. 5,343,681; U.S. Pat. No. 4,426,831; and U.S. Pat. No. 5,775,078.

While these devices fulfill their respective, particular objectives and requirements, the aforementioned patents do not disclose a new lawnmower blade. The inventive device includes elongated bar. The bar is adapted to engage a drive shaft of a lawnmower. The bar has a generally arcuate first cutting edge. The first cutting edge extends along a first side edge of the bar proximate a first end of the bar to a distal end of a second side edge of the bar. The bar further has a generally arcuate second cutting edge. The second cutting edge extends along the second side edge of the bar proximate a second end of the bar to a distal end of the first side edge of the bar.

In these respects, the lawnmower blade according to the present invention substantially departs from the conventional concepts and designs of the prior art, and in so doing provides an apparatus primarily developed for the purpose of cutting grass with a scything action.

SUMMARY OF THE INVENTION

In view of the foregoing disadvantages inherent in the known types of lawnmower blades now present in the prior art, the present invention provides a new lawnmower blade construction wherein the same can be utilized for cutting grass with a scything action.

The general purpose of the present invention, which will be described subsequently in greater detail, is to provide a new lawnmower blade apparatus and method which has many of the advantages of the lawnmower blades mentioned heretofore and many novel features that result in a new lawnmower blade which is not anticipated, rendered obvious, suggested, or even implied by any of the prior art lawnmower blades, either alone or in any combination thereof.

To attain this, the present invention generally comprises elongated bar. The bar is adapted to engage a drive shaft of a lawnmower. The bar has a generally arcuate first cutting edge. The first cutting edge extends along a first side edge of the bar proximate a first end of the bar to a distal end of a second side edge of the bar. The bar further has a generally arcuate second cutting edge. The second cutting edge extends along the second side edge of the bar proximate a second end of the bar to a distal end of the first side edge of the bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawnmower blade apparatus and method which has many of the advantages of the lawnmower blades mentioned heretofore and many novel features that result in a new lawnmower blade which is not anticipated, rendered obvious, suggested, or even implied by any of the prior art lawnmower blades, either alone or in any combination thereof.

It is another object of the present invention to provide a new lawnmower blade that may be easily and efficiently manufactured and marketed.

It is a further object of the present invention to provide a new lawnmower blade that is of a durable and reliable construction.

An even further object of the present invention is to provide a new lawnmower blade which is susceptible of a low cost of manufacture with regard to both materials and labor, and which accordingly is then susceptible of low prices of sale to the consuming public, thereby making such lawnmower blade economically available to the buying public.

Still yet another object of the present invention is to provide a new lawnmower blade which provides in the apparatuses and methods of the prior art some of the advantages thereof, while simultaneously overcoming some of the disadvantages normally associated therewith.

Still another object of the present invention is to provide a new lawnmower blade for cutting grass with a scything action.

Yet another object of the present invention is to provide a new lawnmower blade which includes elongated bar. The bar is adapted to engage a drive shaft of a lawnmower. The bar has a generally arcuate first cutting edge. The first cutting edge extends along a first side edge of the bar proximate a first end of the bar to a distal end of a second side edge of the bar. The bar further has a generally arcuate second cutting edge. The second cutting edge extends along the second side edge of the bar proximate a second end of the bar to a distal end of the first side edge of the bar.

Still yet another object of the present invention is to provide a new lawnmower blade that will not pull grass roots out of the ground.

Even still another object of the present invention is to provide a new lawnmower blade that will easily cut through thick grass.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
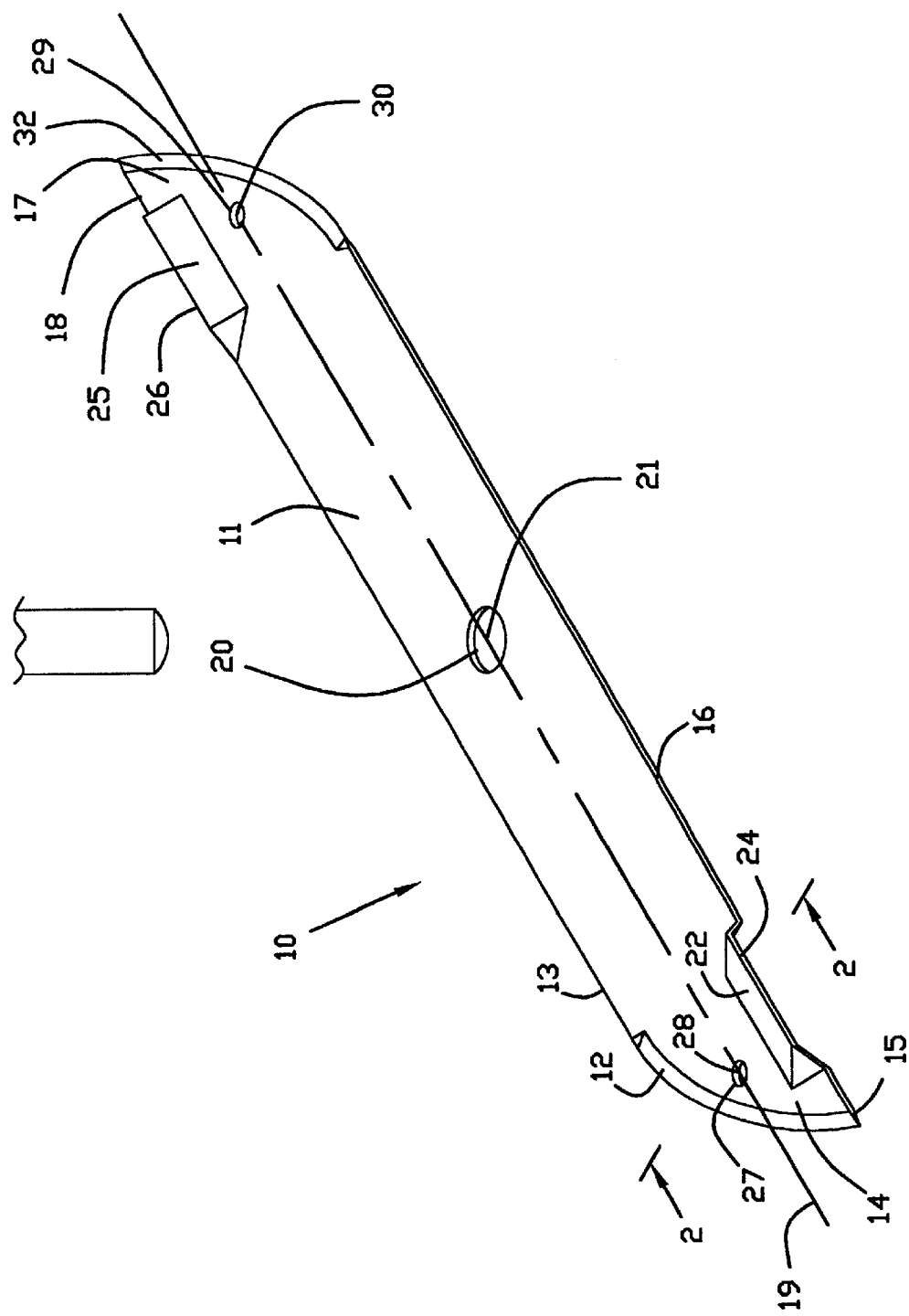
FIG. 1 is a schematic perspective view of a new lawnmower blade according to the present invention.
Figure 2:
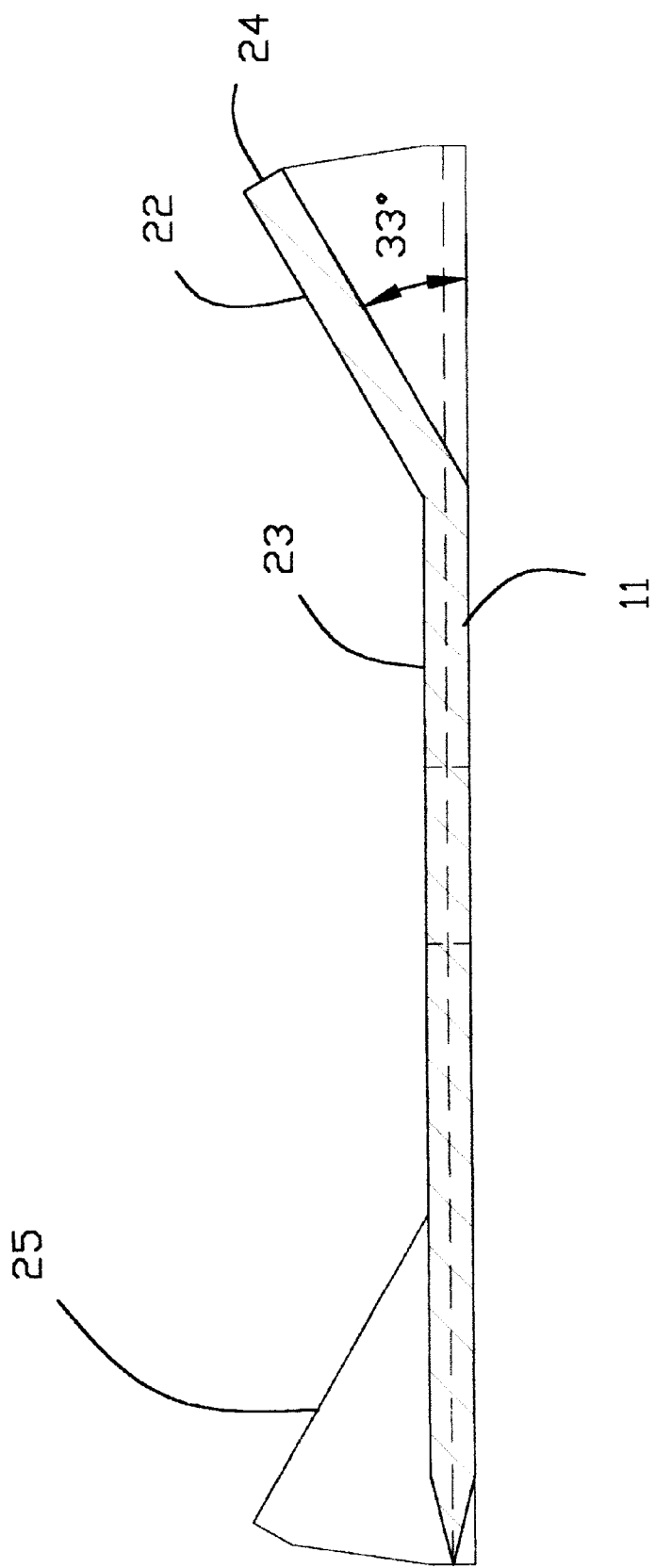
FIG. 2 is a schematic cross-sectional side view of the present invention.

With reference now to the drawings, and in particular to FIGS. 1 through 2 thereof, a new lawnmower blade embodying the principles and concepts of the present invention and generally designated by the reference numeral 10 will be described.

As best illustrated in FIGS. 1 through 2, the lawnmower blade 10 generally comprises an elongated bar 11. The bar 11 is designed to engage a drive shaft of a lawnmower. The bar 11 has a generally arcuate first cutting edge 12. The first cutting edge 12 extends along a first side edge 13 of the bar 11 proximate a first end 14 of the bar 11 to a distal end 15 of a second side edge 16 of the bar 11. The bar 11 further has a generally arcuate second cutting edge 31. The second cutting edge 31 extends along the second side edge 16 of the bar 11 proximate a second end 17 of the bar 11 to a distal end 18 of the first side edge 13 of the bar 11.

In closer detail, the bar 11 has a longitudinal axis 19 and a center aperture 20. The center aperture 20 has a center axis 21 that is aligned with the longitudinal axis 19 of the bar 11. Moreover, the center aperture 20 is designed to engage a drive shaft of a lawnmower.

The bar 11 further has a first fan portion 22 for creating an updraft when the bar 11 is rotated about the center axis 21 of the center aperture 20. The first fan portion 22 has a predetermined length and extends from an upper surface 23 of the bar at a 33° angle. The first fan portion 22 is positioned proximate the distal end 15 of the second side edge 16 of the bar 11. Moreover, the first fan portion 22 has a distal edge 24 that is positioned in a plane formed by the second side edge 16.

The bar 11 also has a second fan portion 25 for creating an updraft when the bar 11 is rotated about the center axis 21 of the center aperture 20. The second fan portion 25 extends from the upper surface 23 of the bar at a 33° angle. The second fan portion 25 is positioned proximate the distal end 18 of the first side edge 13 of the bar 11. Moreover, the second fan portion 25 further has a distal edge 26 that is positioned in a plane formed by the first side edge 13.

The bar 11 also has a first storing aperture 27 for allowing the bar 11 to be hanged for storage. The first storing aperture 27 is positioned proximate the first end 14 of the bar 11. The first storage aperture 27 has a center axis 28 that is aligned with the longitudinal axis 19 of the bar 11.

In addition, the bar 11 further has a second storing aperture 29. The second storing aperture 29 is positioned proximate the second end 17 of the bar 11. The second storage aperture 29 further has a center axis 30 aligned with the longitudinal axis 19 of the bar 11.

In use, the bar 11 is engaged to a drive shaft of a lawnmower so the upper surface 23 of the bar 11 is positioned away from the grass to be cut. When the bar 11 is rotated in a direction which the first and second cutting edges 12, 31 face the grass to be cut, the first and second fan portions 22, 25 lifts the grass up and the first and second cutting edges 12, 31 cuts the grass off.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lawnmower blade comprising:
    an elongated planar bar, said elongated planar bar having a center aperture such that said elongated planar bar is adapted for coupling to a drive shaft of a lawnmower, said elongated planar bar further having a generally arcuate first cutting edge, said first cutting edge extending along a curved portion of a first side edge of said elongated planar bar proximate a first end of said elongated planar bar to a distal end of a straight portion of a second side edge of said elongated planar bar;
    said elongated planar bar having a second end, said elongated planar bar further having a generally arcuate second cutting edge, said second cutting edge extending along a curved portion of said second side edge of said elongated planar bar proximate said second end of said elongated planar bar to a distal end of a straight portion of said first side edge of said elongated planar bar;
    said center aperture having a center axis aligned with a longitudinal axis of said elongated planar bar;

a first fan portion having a pre-determined length for creating an updraft when said elongated planar bar is in use, said first fan portion extending from an upper surface of said elongated planar bar at a predetermined angle, said first fan portion being positioned proximate said distal end of said straight portion of said second side edge of said elongated planar bar;

said first fan extending from said upper surface of said elongated planar bar at about a 33 degree angle from said upper surface;

said first fan portion further having a distal edge, said distal edge of said first fan portion being positioned in a plane transverse to a plane in which said elongated planar bar is positioned and in which said straight portion of said second side edge lies;

said elongated planar bar having a second fan portion of predetermined length for creating an updraft when said elongated planar bar is in use, said second fan portion extending from an upper surface of said elongated planar bar at a predetermined angle, said second fan portion being positioned proximate said distal end of said straight portion of said first side edge of said elongated planar bar;

said second fan extending from said upper surface of said elongated planar bar at about a 33 degree angle from said upper surface;

said second fan portion further having a distal edge, said distal edge of said first fan portion being positioned in a plane transverse to a plane in which said elongated planar bar is positioned and in which said straight portion of said first side edge lies;

said elongated planar bar further having a first storing aperture, said first storing aperture being positioned proximate said first end of said elongated planar bar;

said first storage aperture having a center axis aligned with a longitudinal axis of said elongated planar bar;

said elongated planar bar further having a second storing aperture, said second storing aperture being positioned proximate said second end of said elongated planar bar; and said second storage aperture having a center axis aligned with a longitudinal axis of said elongated planar bar.

* * * * *